(12) United States Patent
Durig

(10) Patent No.: US 7,326,016 B2
(45) Date of Patent: Feb. 5, 2008

(54) FASTENING ELEMENT WITH A WASHER

(75) Inventor: Markus Durig, Gaschum (AT)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 11/516,744

(22) Filed: Sep. 5, 2006

(65) Prior Publication Data

US 2007/0053768 A1 Mar. 8, 2007

(30) Foreign Application Priority Data

Sep. 7, 2005 (DE) .................. 10 2005 000 112

(51) Int. Cl.
*F16B 15/00* (2006.01)
(52) U.S. Cl. ..................... 411/441; 411/533
(58) Field of Classification Search .......... 411/440, 411/441, 533, 180
See application file for complete search history.

(56) References Cited

U.S. PATENT DOCUMENTS

| | | | | |
|---|---|---|---|---|
| 2,415,695 A | * | 2/1947 | Cann | 411/180 |
| 3,289,522 A | * | 12/1966 | Bell | 411/371.2 |
| 3,320,845 A | * | 5/1967 | Eschweiler | 411/441 |
| 3,490,329 A | * | 1/1970 | Pratorius | 411/441 |
| 3,841,474 A | * | 10/1974 | Maier | 206/346 |
| 4,028,986 A | * | 6/1977 | Beton | 411/440 |
| 6,334,749 B1 | * | 1/2002 | Orr | 411/461 |
| 6,669,419 B1 | * | 12/2003 | Fleetwood | 411/131 |
| 6,789,364 B2 | * | 9/2004 | Popovich et al. | 52/506.01 |
| 6,824,342 B2 | * | 11/2004 | Gassmann et al. | 411/441 |
| 7,182,565 B2 | * | 2/2007 | Buytaert et al. | 411/441 |

* cited by examiner

*Primary Examiner*—Flemming Saether
(74) *Attorney, Agent, or Firm*—Abelman, Frayne & Schwab

(57) ABSTRACT

A fastening element having a stem (11) with a tip (12) provided at one of its ends, a head (13) provided at another opposite end, and a guide cylindrical member (30) mounted on the stem (11) for guiding the fastening element (10) in a bolt guide (40) of a setting tool, and having a retaining section (33) for retaining a washer (20).

6 Claims, 3 Drawing Sheets

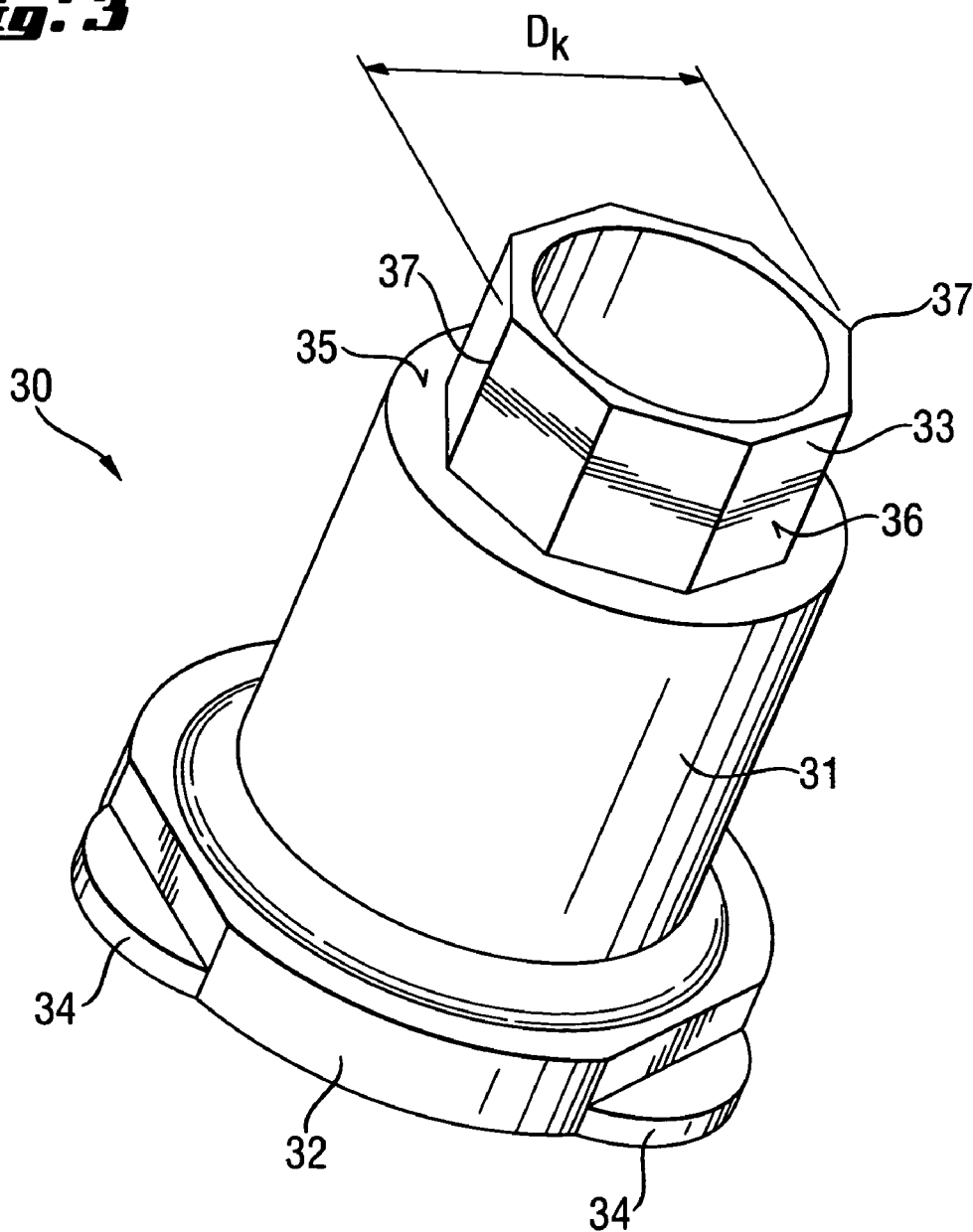

FASTENING ELEMENT WITH A WASHER

BACKGROUND OF THE INVENTION

1. Field of the Invention

The present invention relates to a fastening element with a washer and having a stem with a tip provided at one of its ends, a head provided at another opposite end of the stem, and a guide cylindrical member mounted on the stem for guiding the fastening element in a bolt guide of a setting tool.

2. Description of the Prior Art

Fastening elements of the type discussed above, such as, e.g., nails, bolts and the like made of steel and having a washer are used in the fastening technology for fastening objects to a receiving materials such as concrete, metal, stone. The fastening elements have, as discussed above, a stem with a tip tapering in a setting direction, and a head provided at the stem opposite end and having an increased size with respect to the diameter of the stem and the diameter of the washer opening. The drive-in process is carried out with a high speed in a percussion manner or with a single blow by, e.g., combustion-engined setting tool. For guiding the fastening element in the bolt guide of the setting tool, a guide cylindrical member is pulled onto the stem of the fastening element.

U.S. Pat. No. 4,286,496 discloses a nail-shaped fastening element having a head at one end of the stem and a tip at the stem end opposite the head. A guide member is pulled onto the stem for guiding the fastening element in a bore of the nose of a setting tool.

The drawback of the known fastening element consists in that when the fastening element has to be set in with a washer, the washer is held manually at the front of the nose of the setting tool or is pinned onto the stem of the fastening element.

An object of the present invention is to provide a fastening element in which the foregoing drawbacks of the known fastening element are eliminated.

Another object of the present invention is to provide a fastening element in which the washer is reliably positioned and retained on the fastening element.

SUMMARY OF THE INVENTION

These and other objects of the present invention, which will become apparent hereinafter, are achieved by providing a fastening element of the type discussed above in which the guide cylindrical member has a retaining section for retaining the washer.

The retaining section permits to reliably position and retain the washer on the fastening element. The manual holding of the washer on the nose or at the mouth of the setting tool is not any more necessary. Manual pinning of the washer on the stem of the fastening element and a resulting unreliable positioning are likewise eliminated.

Advantageously, the retaining section is formed as a cylindrical section onto which the washer is pinned on. With the retaining section having a cylindrical cross-section, no contact between the washer and the stem off the fastening element takes place. Thereby, scratching of the coated surface, if provided, of the fastening element is prevented during a setting process.

An optimal positioning of the washer is achieved when the guide cylindrical member has a cylindrical section adjoining the retaining section, with a transition from the retaining section to the cylindrical section forming a stop for the washer.

Preferably, the stop is formed by a reduction of a cross-section from the cylindrical section to the retaining section. This permits to form the stop in a particularly simple manner.

Advantageously, the washer is frictionally retained on the retaining section. Thereby, additional locking elements can be eliminated.

Advantageously, the guide cylindrical member is formed of a plastic material. The plastic material is noticeably weaker than the surface coating of the fastening element, e.g., a zinc layer and, therefore, reliably prevents scratching of such a surface.

A frictional connection between the washer with a round opening and the guide cylindrical member can be easily achieved by providing the retaining section with a polygonal outer surface having at least six outer elongate edges for frictionally retaining the washer.

Preferably, the outer surface of the retaining section has eight outer elongate edges.

At an optimal geometry, an inner diameter of an opening of the washer is larger than an outer diameter of the stem by about 10%-20%. A contact between the washer and the stem can be prevented by almost 100% at all settings.

An optimal frictional connection is achieved when another diameter of the retaining section between two opposite elongate edges is by about 0.05 mm to 0.25 mm larger than an inner diameter of an opening in the washer.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiments, when read with reference to the accompanying drawings.

BRIEF DESCRIPTION OF THE DRAWINGS

The drawings show:

FIG. 3 a perspective view of the guide cylindrical member of the inventive fastening element.

DETAILED DESCRIPTION OF THE PREFERRED EMBODIMENTS

Figure 1:
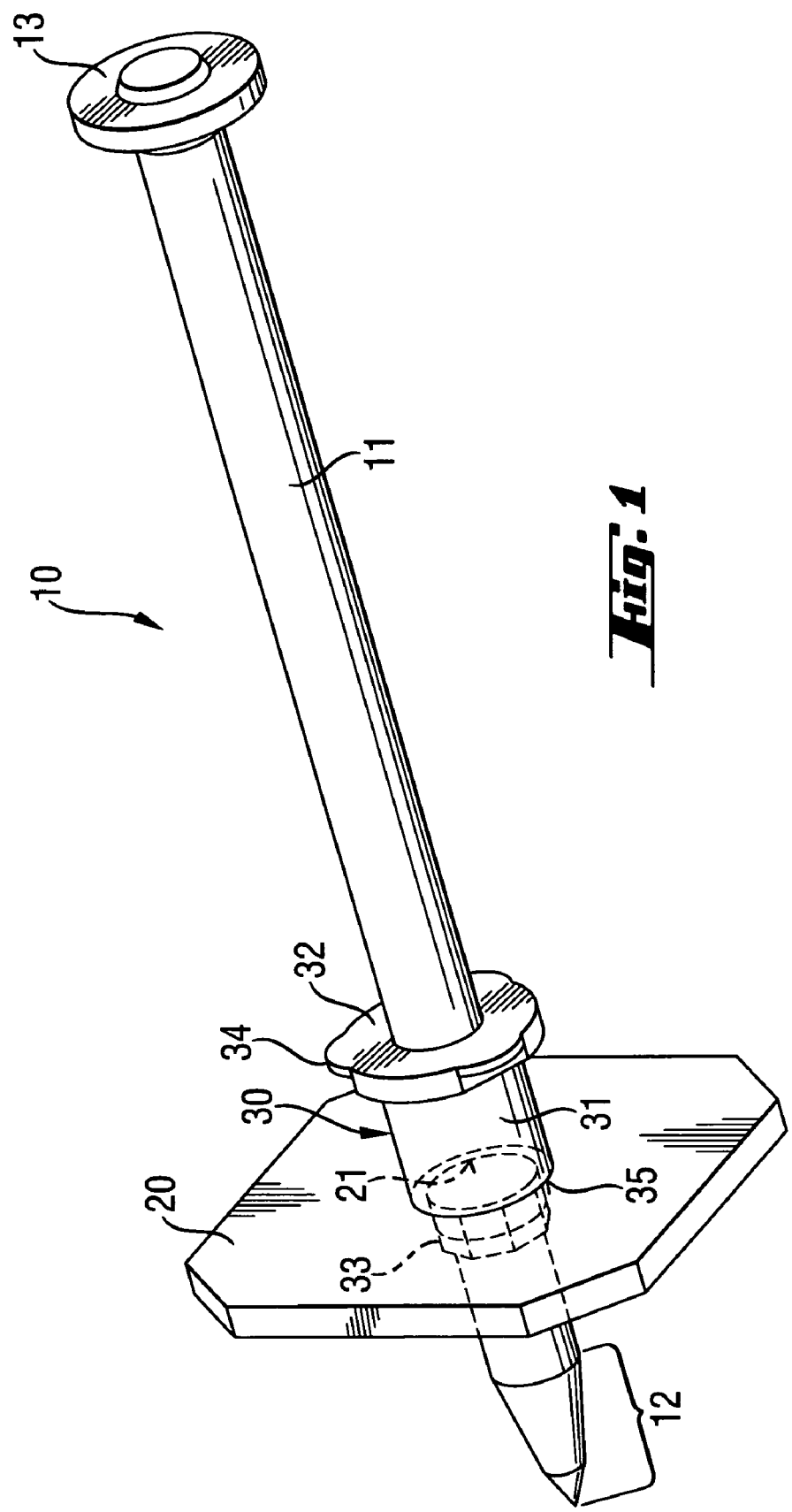
FIG. 1 a perspective view of a fastening element according to the present invention.
Figure 2:
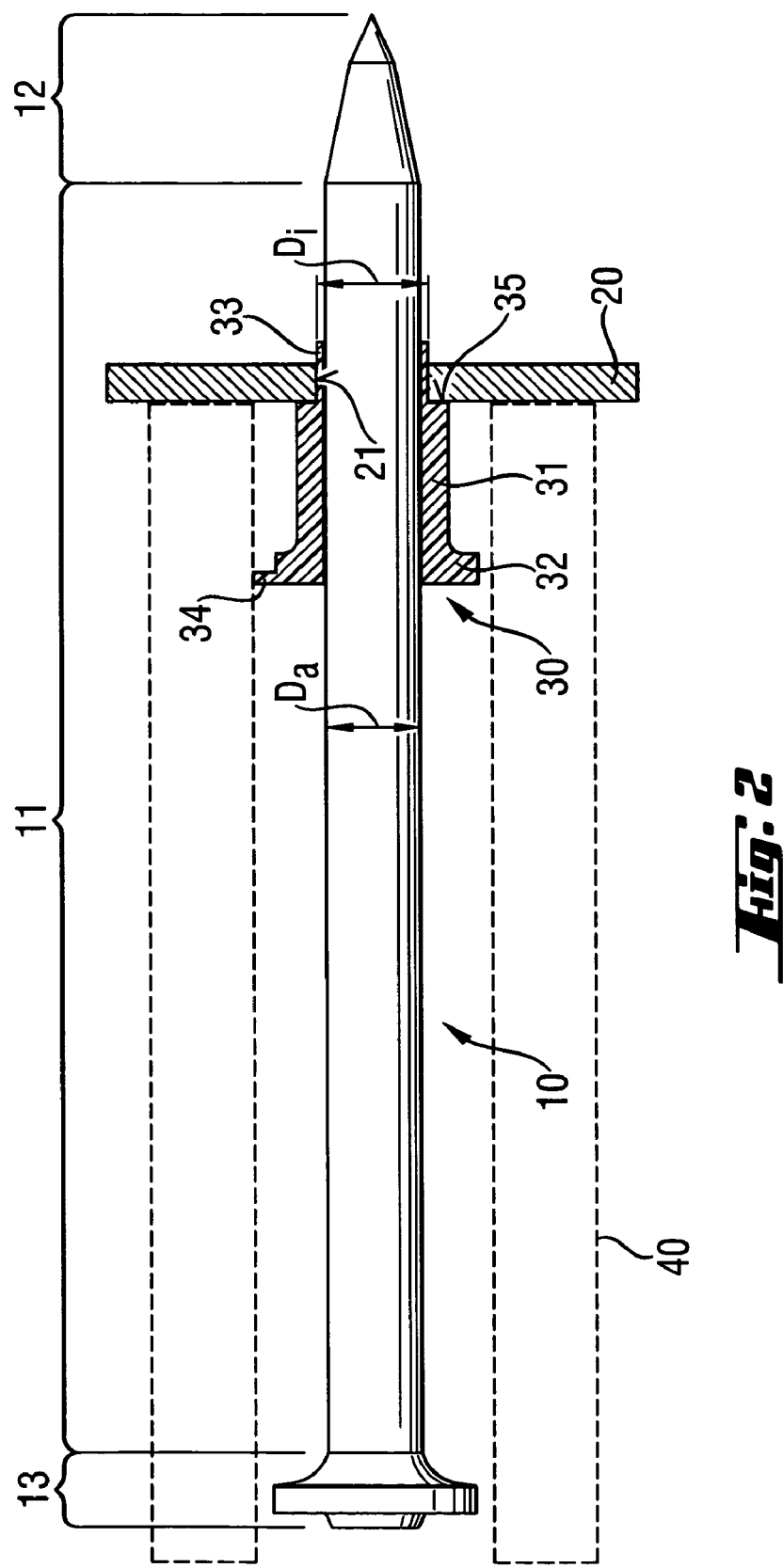
FIG. 2 a cross-sectional view of the fastening element shown in FIG. 1 with a guide cylindrical member and a washer.

FIGS. 1 and 2 show a fastening element 10 according to the present invention which is formed as a nail. The inventive fastening element 10 has a head 13, a stem 11 adjoining the head 13, and a tip 12 provided at an end of the stem 11 remote from the head 13. The fastening element 10 is provided with a coating that insures the corrosion resistance of the fastening element 10. A guide cylindrical member 30 of a plastic material is provided on the stem 11 in its end region adjacent to the tip 12. The guide cylindrical member 30 is sleeve-shaped and has a cylindrical section 31 over which the guide cylindrical member 30 is guided on the stem 11 and is frictionally retained. At an end of the guide cylindrical member 30 adjacent to the tip 12, there is provided a retaining section 33 formed as a cylindrical section having a smaller wall thickness than the cylindrical section 31. A washer 20 is pinned onto the cylindrical section 33 with its opening 21 up to a stop 35 that is formed as a result of a reduction of the cross-section from the cylindrical section 31 to the retaining section 33. The washer 20 is retained, e.g., by friction. The friction connection is provided by a special polygonal outer surface 36 of the retaining section 33 and which has eight elongate edges 37, as shown in particular in FIG. 3. The diameter $D_k$ at the outer edges 37 of the retaining section 33 is somewhat larger, e.g., in a range from about 0.1 mm to 0.25 mm, preferably 0.15 to 0.2 mm, than the inner diameter $D_i$ of the opening 21 in the washer 20. The inner diameter $D_i$ of the opening 21 in the washer 20 is larger than the outer diameter $D_a$ of the stem 11 by about 10%-20%. This excludes a contact of the washer 20 with the outer surface of the fastening element 10 and, thereby, any damage of the outer surface during a setting process is prevented.

On the end of the retaining section 33, there can be provided locking projections for securing the washer 20 in its position on the retaining section 33.

The guide section 32, which has a circular cross-section and has guide means 34, e.g., in form of guide lips, insure guidance and centering of the fastening element 10 in a bolt guide 40 shown in FIG. 2 with dash line.

Though the present invention was shown and described with references to the preferred embodiment, such are merely illustrative of the present invention and are not to be construed as a limitation thereof and various modifications of the present invention will be apparent to those skilled in the art. It is therefore not intended that the present invention be limited to the disclosed embodiment or details thereof, and the present invention includes all variations and/or alternative embodiments within the spirit and scope of the present invention as defined by the appended claims.

What is claimed is:

1. A fastening element, comprising a stem (11) having a tip (12) provided at one end thereof; a head (13) provided at another opposite end of the stem (11); and a guide cylindrical member (30) mounted on the stem (11) for guiding the fastening element (10) in a bolt guide (40) of a setting tool, the guide cylindrical member (30) having a retaining section (33) for frictionally retaining a washer (20), wherein the retaining section (33) has a polygonal outer surface (36) with at least six outer elongate edges (37) for frictionally retaining the washer (20).

2. A fastening element according to claim 1, wherein the guide cylindrical member (30) has a cylindrical section (31) adjoining the retaining section (33), a transition from the retaining section (33) to the cylindrical section (31) forming a stop (35) for the washer (20).

3. A fastening element according to claim 2, wherein the stop (35) is formed by a reduction of a cross-section from the cylindrical section (31) to the retaining section (33).

4. A fastening element according to claim 1, wherein the guide cylindrical member (30) is formed of a plastic material.

5. A fastening element according to claim 1, wherein the outer surface (36) of the retaining section (33) has eight outer elongate edges (37).

6. A fastening element according to claim 1, wherein an outer diameter ($D_k$) of the retaining section (33) between two opposite elongate edges (37) is by about 0.05 mm to 0.25 mm larger than an inner diameter ($D_i$) of an opening (21) in the washer (20).

* * * * *